United States Patent [19]
Aghnides

[11] 3,821,995
[45] July 2, 1974

[54] VEHICLE WITH COMPOSITE WHEEL
[76] Inventor: Elie P. Aghnides, 795 Fifth Ave., New York, N.Y. 10021
[22] Filed: Oct. 15, 1971
[21] Appl. No.: 189,669

[52] U.S. Cl............. 180/6.2, 180/21, 301/41 R
[51] Int. Cl.................. B60b 11/00, B62d 11/06
[58] Field of Search......... 180/6.2, 21, 29, 27, 7 R; 301/1 R, 36 WP, 41 R; 115/1 R

[56] References Cited
UNITED STATES PATENTS

| | | | |
|---|---|---|---|
| 2,812,031 | 11/1957 | Aghnides | 180/27 |
| 3,014,547 | 12/1961 | VanDerLely | 301/41 R X |
| 3,017,941 | 1/1962 | Baker | 180/6.2 |
| 3,424,259 | 1/1969 | Aghnides | 180/29 |
| 3,465,843 | 9/1969 | Guinot | 180/79.3 |

Primary Examiner—David Schonberg
Assistant Examiner—John A. Pekar
Attorney, Agent, or Firm—William D. Hall

[57] ABSTRACT

The disclosure relates to a vehicle with hemispheroidal wheels, at least one of which is a composite wheel and a steering means for the vehicle. The composite wheel is generally hemispheroidal in shape and has two parts, i.e. a large treaded portion for use on soft unstable ground, and a smaller rod surface portion. The respective axes of rotation for the two portions may be varied to place the smaller road surface part in a vertical or upright position, to lift the larger portion away from the road surface or to leave it in its normal slightly-above-the ground position for conventional use on roads or firm terrain. The two wheel portions may be aligned or left unaligned for use in soft, unstable terrain.

17 Claims, 3 Drawing Figures

INVENTOR
Elie P. Aghnides

BY Hall, Pollock & Vande Sande
ATTORNEY

VEHICLE WITH COMPOSITE WHEEL

BACKGROUND OF THE INVENTION

This invention relates to all-purpose vehicles, i.e. those vehicles which are preferably amphibious and generally capable of operating over deep snow, soft mud, or sand with equal facility. It is well known that a vehicle which is equipped with tilted hemispheroidal wheels has more traction area and greater buoyancy than a vehicle equipped with conventional wheels. These tilted hemispheroidal wheels have improved characteristics in unstable terrain in the sense of being better able than conventional wheels to rise out of soft terrain such as snow and sand in which the wheel has become partially submerged. When a conventional wheel is rotated under such circumstances, there is a natural tendency for the wheel to sink further into the supporting material; whereas, with a tilted hemispherical or spheroidal wheel, the natural scuffing action which is produced by different linear velocities of different portions of the shell stemming from a portion of the major diameter down to the minimum diameter at the apex of the sphere, greatly enhances the ability of the wheel to arise out of the surrounding material. With the improved wheel of the present invention, it is possible, by locking the smaller portion of the composite wheel to the larger portion to have the combination act in the same manner as an integral tilted hemispheroidal wheel. Thus, the tire of reduced diameter then rotates at the same angular velocity as the larger diameter tire but with a significantly lower linear velocity and the natural scuffing action thus produced has been shown to be beneficial in making it possible for the vehicle to rise out of the terrain in which it is partially submerged.

In my U.S. Pat. No. 3,424,259, issued Jan. 28, 1969, I have disclosed and claimed a vehicle having a plurality of wheels of different diameter. In that patent, the composite wheel is of generally hemispheroidal shape with its axle slanted outwardly and downwardly relative to the body of the vehicle. The vehicle is supported by spaced tires, with the outer and lowermost tire doing the driving on normal terrain, while the larger inner wheel rotates through a free wheeling action. This presents the same linear speed to the road surface and thereby avoids scuffing of the wheel surfaces. This patent also discloses locking the two wheel members together to provide for differential linear speeds in soft terrain to avoid drag and maintain the buoyancy of the vehicle.

Other advantages and arrangements for this general type of wheel are heretofore disclosed in my U.S. Pat. No. 2,372,043, issued on Mar. 20, 1945, U.S. Pat. No. 2,967,581, issued Jan. 10, 1961, my U.S. Pat. No. 2,998,996, issued Sept. 5, 1961, and my U.S. Pat. No. 3,001,601, issued Sept. 26, 1961.

The present invention, however, discloses an improved method of operating a vehicle with hemispheroidal wheels on a regular road surface. The axis of rotation of the outer or apex wheel is changed to thereby provide for a conventional upright wheel, while preferably raising the large inner wheel portion further away from the road surface. In this manner the vehicle is allowed to operate as a normal vehicle on firm terrain. However, in some terrain, the axis of the outer or apex wheel is aligned with the rotational axis of the tilted large hemispheroidal wheel to present the differential speed, or scuffing action referred to above.

It is therefore an object of this invention to provide an improved hemispheroidal wheel suitable for use on conventional roadways and adaptable to improved action in soft terrain. It is another object of this invention to provide a driving arrangement for the improved hemispheroidal wheel and a steering arrangement for the vehicle equipped with hemispheroidal wheels in general.

It is further an object of this invention to provide a hemispheroidal wheel with an outwardly and downwardly inclined axle wherein the first and largest portion of the hemispheroidal wheel rotates about said axle adjacent the vehicle body, while the outer or second portion of the hemispheroidal wheel rotates about an axle parallel to the lateral axis of the vehicle.

It is another object of this invention to provide a vehicle with hemispheroidal wheels which are steered by varying the linear or peripheral speed of the wheels on either side of the longitudinal axis of the vehicle. The change in linear speed is brought about by a variable speed transmission for each of the sets of hemispheroidal wheels as by reversing the rotation on one side and driving forward on the other.

DESCRIPTION OF THE PREFERRED EMBODIMENTS

Figure 1:
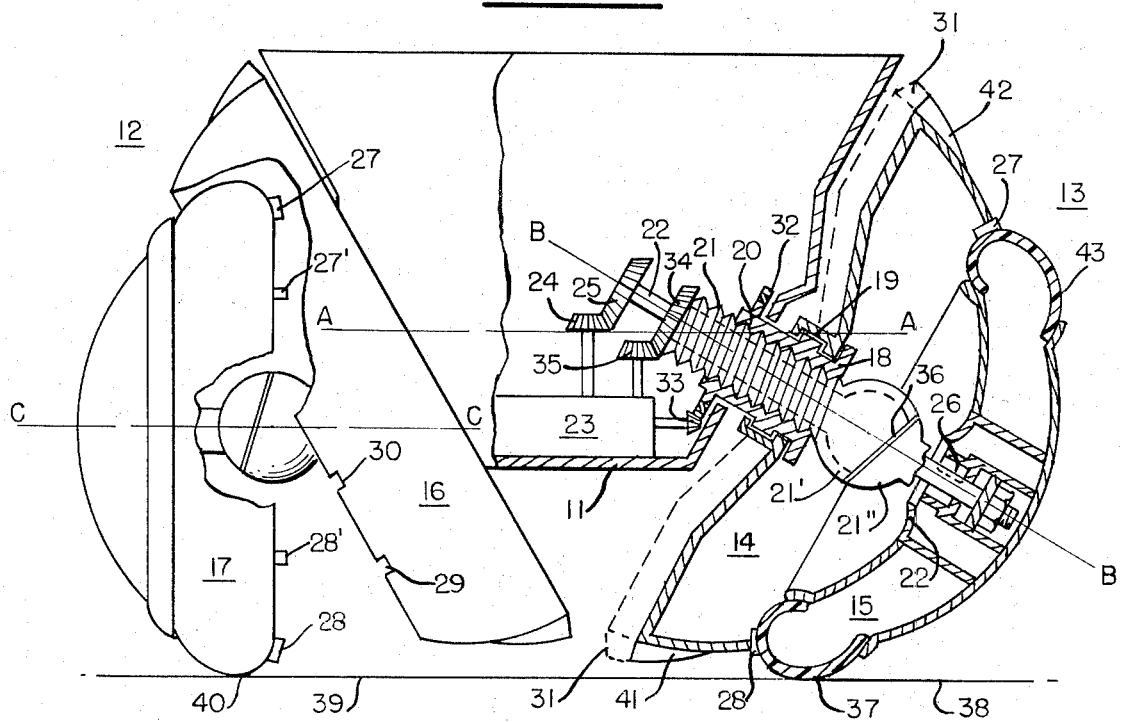
FIG. 1 is a partial cross-section of a frontal view of the vehicle equipped with the hemispheroidal wheels of my invention.

FIG. 1 is a partial cross-section of a vehicle equipped with hemispheroidal wheels constructed in accordance with my invention. The vehicle has a frame and body member 11 which may be of triangular or trapezoidal cross-section, as shown. Hemispheroidal wheels 12 and 13 are illustrated in the two operating positions in which they are normally found. As pointed out previously, these wheels are comprised of two parts, a first portion 14 and a second portion 15 for hemispheroidal wheel 13, and a first portion 16 and a second portion 17 for hemispheroidal wheel 12.

When the vehicle is set to be operated in snow, sand or boggy terrain, the first and second portions are oriented as illustrated in the cross-section of hemispheroidal wheel 13. When the hemispheroidal wheel is to be operated on firm ground, the orientation is that illustrated for hemispheroidal wheel 12.

The first portion 14 is mounted for rotation around axis BB. This wheel rotates on sleeve member 18 by means of the bearing and raceway assembly 19 illustrated for the hemispheroidal wheel 13. Sleeve 18 is equipped with thread members 20 which are threadably engaged with the main axle member 21. The main axle member 21 also defines an axial opening for drive shaft 22.

When set for operation on soft terrain, the main axle member 21 is oriented along axis line BB which is at an angle to and downwardly inclined from the lateral axis AA of the main vehicle frame and body member 11. The driving power for the vehicle is transmitted from transmission means 23 through bevel gears 24 and 25 to drive shaft 22. This shaft then transmits its rotational motion through a universal joint (not shown) located in the bulbous portion 21' of the main axle member 21. This drive shaft continues out and is fixably attached to wheel member 15 by means of a key member 26. The first wheel portion 14 is normally free wheeling around collar member 18 by virtue of the bearing raceway 19. When in the first mode of operation, the wheel member 14 is locked to the second portion 15 by virtue of the lugs 27 and 28 defined on the periphery of the second wheel portion 15. These lug members engage the openings defined in the first wheel portion 14. The openings themselves are as illustrated by numeral 29 and 30 in the first wheel portion of hemispheroidal wheel 12.

When it is desired to place the vehicle in its second mode of operation for travel on a hard surface road, the first wheel portion is raised along the axis BB towards body and frame member 11. This disengages the first wheel portion 14 from the second wheel portion 15 and allows it to free wheel on bearing raceway 19. The full extent of this upward travel is indicated by the dotted line wheel portion illustrated at 31.

Wheel member 14 is raised along axis BB and main axle 21 by means of the elevator threads 20 defined on the inner portion of sleeve 18 and the rotation of sleeve 18 by means of spur gear 32 and bevel gear 33. The rotation of these gears is accomplished by means of transmission means 23. After the first wheel portion 14 has been raised to the position illustrated by dotted lines 31, the main axle member 21 is rotated by means of bevel gears 34 and 35. The power again is provided by transmission 23. As the axle member 21 begins to rotate, the lip member 36 defined on the bulbous portion 21' of axle member 21 begins to rotate from the orientation disclosed in the cross-section illustrated for hemispheroidal wheel 13 to the orientation illustrated for the hemispheroidal wheel 12. As the portion 21' rotates, a second portion 21'' remains fixed. This may be accomplished by means of internal planetary gears (not shown) or by fixably securing member 21' to wheel member 15 during the transition operation. As the two surfaces of lip member 36 rotate, they will change the orientation of the second portion of drive shaft 22 indicated by 22' through the orientation illustrated for hemispheroidal wheel 12. At that point, the axis for rotation for the second wheel portion 15 will be parallel to the lateral axis AA of the vehicle.

When the first portion 14 was raised along axis line BB it not only disengaged wheel portion 14 from wheel portion 15, but it allows space for the upper portion of the second wheel member 15 indicated by lug 27 to move inwardly as indicated for the hemispheroidal wheel 12.

Power for the wheel 15 is still transmitted by means of drive shaft 22 through the universal joint (not shown) contained in the bulbous portion 21' of the axle member 21 through the second axle portion 22' to rotate wheel member 15.

When placed in its second orientation as illustrated by hemispheroidal wheel 12, the first portions 14 and 16 are raised out of ground engagement as illustrated for hemispheroidal wheel 12. This allows the vehicle to travel on the second wheel portions 15 and 17 in a conventional manner. At this point, first wheel portions 14 and 16 are both free wheeling and, being above the ground, do not consume any power. The tread base of the vehicle is also enlarged during this second mode of operation. As the rotational axis of members 15 and 17 is varied to the axis line CC, parallel to the lateral axis AA of the vehicle, the wheel base is varied from points 39 and 37 to the points 38 and 40. This increases the stability of the vehicle for high speed travel on firm terrain.

On soft terrain wherein the wheels are oriented as illustrated for hemispheroidal wheel 13, there is a natural scuffing action produced by the different linear velocities at different portions of the wheel. Since the angular velocity of wheel parts 14 and 15 is the same, the linear velocity of the wheel 14 will necessarily be larger than the linear velocity of wheel portion 15. This greatly enhances the ability of the wheel to rise out of the surrounding snow, mud, sand, or marshland. If desired, wheel member 14 is equipped with cleats 41 and 42 to assist in driving the vehicle in this type of terrain. Additionally, the wheel portion 15 is equipped with a pneumatic tire portion 43 for use on conventional road surfaces, while the first wheel portion 14 may be a relatively rigid material. As illustrated in FIG. 1, the entire enclosed space in wheels 14 and 15 provides a reserve buoyancy for travel in marshland and other wet and boggy terrain. The pneumatic portion 43 of wheel member 15 acts as a seal against the wheel member 14 to provide a large enclosed air space.

Figure 2:
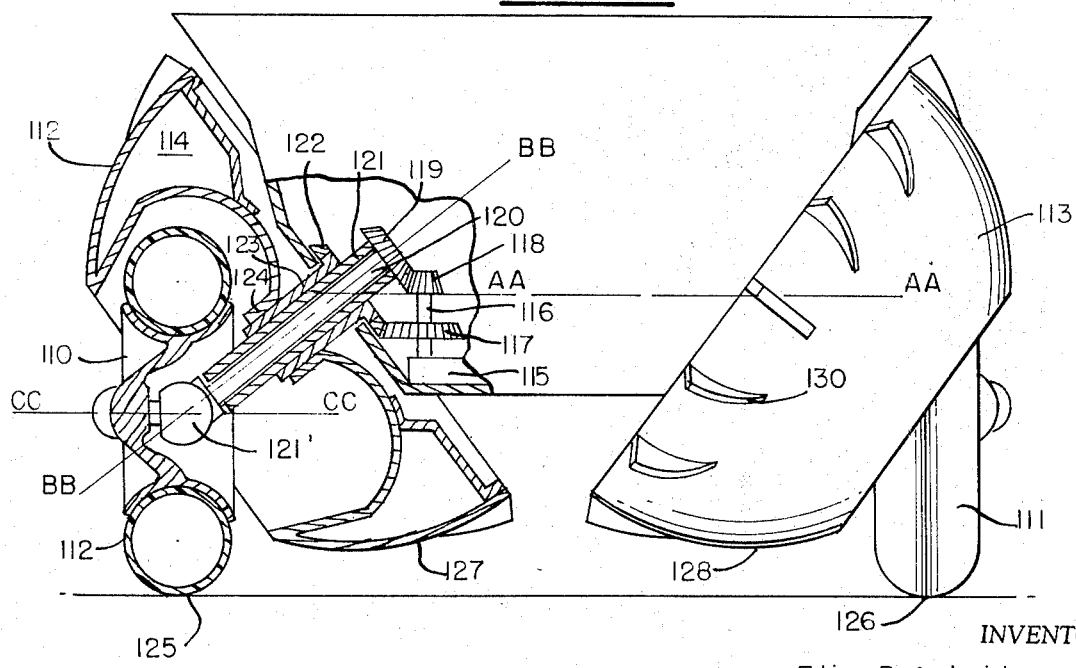
FIG. 2 is a partial cross-section of a frontal view of a vehicle with hemispheroidal wheels constructed in accordance with an alternative embodiment of my invention.

FIG. 2 represents an alternative embodiment of the invention, in which the second wheel portion 110 and 111 are permanently oriented along an axis parallel CC—CC which is parallel to the lateral axis AA—AA of the vehicle. The first wheel portions 112 and 113 are oriented along axis BB—BB which is inclined outwardly and downwardly from the vehicle itself. In this embodiment, wheel members 112 and 113 have defined therein a buoyant space 114 which assists the vehicle when travelling in marshy or boggy terrain. In this second embodiment, the driving power is transmitted to both the first and second wheel portions. The driving power is transmitted from transmission 115 through shaft member 116 to bevel gears 117 and 118. The power transmitted by bevel gear 118 is picked up by matching gear 119 and transmitted by means of the internal shaft 120 to the universal joint (not shown) contained in the bulbous portion 121' of axle member 121. The power to the first wheel portion 112 is transmitted by means of bevel gear 117 to its matching gear 122 which drives collar member 123. The first wheel portion 112 is securely attached to collar member 123 at point 124. This attachment may be by means of bolts, welding, or other relatively permanent means.

The embodiment disclosed in FIG. 2 is designed to operate on all terrain without any alteration. It operates as shown on all relatively stable or firm terrain with wheel members 110 and 111 engaging the ground at points 125 and 126. When the vehicle is driven into snow, sand or mud, the wheel members 110 and 111 will immediately sink under the weight of the vehicle and the vehicle will contact the ground along surfaces 127 and 128 of the first wheel portions 112 and 113. Since no provision for movement of wheel members 110 and 111 is needed, the relative lateral surface of members 112 and 113 can be much greater. In this instance they provide their own scuffing action which tends to raise the vehicle out of the soft terrain. Wheel members 112 and 113 are also equipped with cleats illustrated at 130 to assist travel on soft ground. Bevel gear 117 may be raised if desired to interrupt transmission of power to its matching gear 112 during highway travel. When surface 127 and 128 are inflexible or rubber-like material, the buoyant space 114 is preferably under pressure. Wheel member 14 of FIG. 1 may be likewise constructed.

Figure 3:
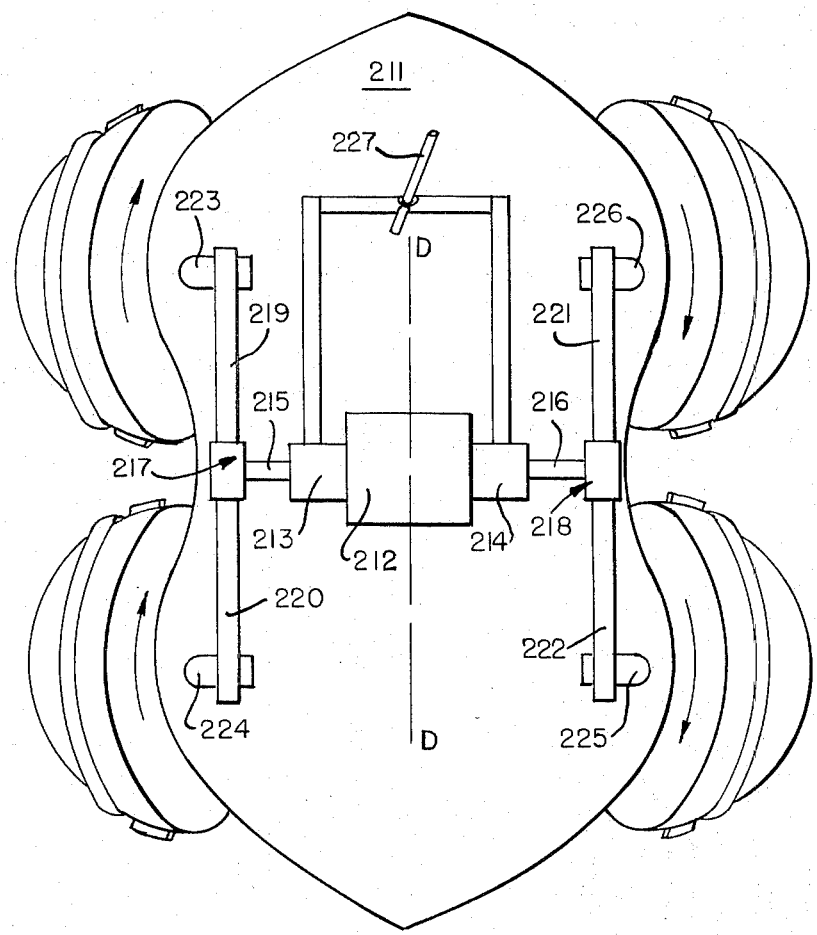
FIG. 3 is a diagrammatic top view illustrating the drive means of a vehicle with hemispheroidal wheels.

FIG. 3 is a plan view of a vehicle utilizing tilted conoidal or hemispheroidal wheels which may be unitary or of the composite type as described above and illustrates a steering means for steering and braking a vehicle equipped with these wheels. Therefore, either of the embodiments disclosed in FIGS. 1 and 2 may be used. It would also be possible to combine the two, using the wheels illustrated in FIG. 2 for the front wheels and those illustrated in FIG. 1 for the rear wheels.

In addition to the steering and braking arrangements illustrated in FIG. 3, the hemispheroidal wheels may also be used with the vehicle described in my U.S. Pat. No. 3,428,259. Either one or both of the embodiments would be suitable for that application.

The vehicle of FIG. 3 has a body member 211 which is oriented along the longitudinal axis DD with two tilted conoidal or hemispheroidal wheels on either side of the unitary or composite type. The main power plant 212 provides an output to two variable speed transmissions 213 and 214 located on either side of the lateral axis of the vehicle. The power is then transmitted by means of shafts 215 and 216 to the chain drive mechanisms 217 and 218. The power is then transmitted by means of chains illustrated diagrammatically at 219, 220, 221, and 222 to the main axle members 223, 224, 225, and 226. Alternatively, the transmission means 213 and 214 may drive shafts and differentials wherein chain means 217 and 218 would be replaced by differential means, and the chain means 219, 220, 221, and 222 would be replaced by drive shafts.

Steering of the vehicle is accomplished by varying the relative speed and output of variable speed transmissions 213 and 214. The operator controls a joy stick 227 or other suitable operating control which in turn regulates the output of variable speed transmissions 213 and 214. As illustrated in FIG. 3, a hard turn to the right has been dictated by the placement of joy stick 227 and variable speed transmission 214 has been placed in reverse while variable speed transmission 213 is full forward. This will tend to rotate the vehicle about its axis and provide for an exceedingly sharp turn.

In a normal turn, the operation would be dictated by merely slowing the output of variable speed transmission 214 and slightly increasing the speed from variable speed transmission 213.

A brake means is also employed in the housings 217 and 218, providing braking action for the vehicle. In an alternative embodiment, these brake means could be used to vary the speed of the vehicle by slowing one set of the hemispheroidal wheels. For a close turn, one set could be clamped entirely while the others rotated freely thereby driving the vehicle around its center axis.

Having described several embodiments of my invention, I wish it to be understood that various modifications and alterations may be made thereto without departing from the spirit or scope of my invention. Those embodiments which can be reasonably construed to fall within the scope of the invention as defined in the appended claims are intended to form a part of my invention. The embodiments described and illustrated are therefore to be taken as illustrative rather than restrictive of the invention.

I claim:

1. A vehicle adapted for use both on hard and soft terrain comprising,
   at least one axle which is tilted outwardly and downwardly,
   a first wheel part rotatable about said axle in a plane normal thereto,
   a second wheel part,
   means connecting said second wheel part with said axle for permitting said second wheel part to rotate at least at times in a generally vertical plane,
   said second wheel part being positioned outwardly and downwardly along said axle in relation to said first wheel part.

2. A vehicle as claimed in claim 1 wherein said first wheel part is partially hemispheroidal in shape, said wheel portion being equipped with cleats for use in soft non-stable terrain.

3. A vehicle as claimed in claim 1 wherein said first wheel part is longitudinally movable along said tilted axle.

4. A vehicle as claimed in claim 1 wherein said vehicle is provided with at least one pair of said first and second wheel parts on each side of its longitudinal and center axis, and means for differentially varying the angular velocities of said second wheel parts on the opposite sides of the vehicle to effect vehicle steering.

5. A vehicle as claimed in claim 4 wherein the angular velocity of one of said second wheel parts is varied by braking one of said second wheel parts.

6. A vehicle as claimed in claim 4 wherein the angular velocity of one of said second wheel parts is varied by a variable speed transmission means.

7. A vehicle as claimed in claim 4 wherein two pairs of first and second wheel parts are mounted on each side of the longitudinal and center axis of said vehicle, two of said second wheel parts on one side of said center axis being connected to a first variable speed transmission, and the other two second wheel parts on the other side of said center axis being connected to a second variable speed transmission.

8. The vehicle of claim 1 which further includes means for clutching together said first and second wheel parts and means for steering said vehicle by varying the rotational speed of the pair of first and second wheel parts on one side of the vehicle relative to that of the pair of first and second wheel parts on the other side of the vehicle.

9. The vehicle of claim 8 wherein said rotational speed is varied by a variable speed transmission means.

10. The vehicle of claim 1 which further includes means for moving said second wheel part to a predetermined position on said axle wherein it rotates parallel to said first wheel part.

11. The vehicle of claim 10 which further includes means effective when said second wheel part is in its said predetermined position for causing said second wheel part to rotate with the same angular velocity as said first wheel part.

12. The vehicle of claim 10 wherein said first wheel part is free-wheeling when said second wheel part is in its said vertical position.

13. The vehicle of claim 1 wherein said second wheel part is of smaller diameter than said first wheel part, the relative diameter of said first and second wheel parts and the tilt of said axle being such that the lowest portion of said first wheel part lies above the lowest portion of said second wheel part when the latter is in its vertical position.

14. A vehicle adapted for use on both hard or soft terrain comprising,
    two axles on each side of the vehicle, each being tilted outwardly and downwardly,
    at least one wheel member rotatable about each said axle,
    said wheel member being generally of hemispheroidal configuration and so disposed on the respective axle that the cross-sectional part of said wheel which is of largest diameter lies inwardly and upwardly of said tilted axle relative to the cross-sectional part of smallest diameter,
    a first variable speed transmission means operatively connected to drive the wheel members on one axle of the vehcile and a second variable speed transmission means operatively connected to drive the wheel members on the other side of the vehicle,
    whereby said vehicle may be steered by differentially controlling the relative angular speeds of the wheel members on the opposite sides of the wheels.

15. The vehicle of claim 14 which further includes means for turning in a forward direction the two tilted wheels on one side of the vehicle while concurrently turning rearwardly the two tilted unitary wheels on the other side of the vehicle to effect a sharp steering of the vehicle.

16. A vehicle adapted for use on both hard and soft terrain comprising:
    two axles on each side of the vehicle, each being tilted outwardly and downwardly;
    at least one wheel member rotatable on each axle, each wheel member having a rolling ground-contacting surface of generally decreasing diameter as the distance from the vehicle body increases,
    a first variable speed transmission means operatively connected to drive the wheel members on at least one axle on one side of the vehicle selectively in either the forward or reverse directions and a second variable speed transmission means operatively connected to drive the wheel members on at least one axle on the other side of the wheel selectively in either the forward or reverse directions,
    whereby said vehicle may be steered by driving said wheel members on one side of the vehicle in the forward direction while concurrently driving said wheel members on the other side of the vehicle in the reverse direction.

17. A vehicle adapted for use on both hard and soft terrain comprising:
    two axles on each side of the vehicle, each being tilted outwardly and downwardly;
    at least one wheel member rotatable on each axle, each wheel member having a rolling ground-contacting surface of generally decreasing diameter as the distance from the vehicle body increases,
    a first variable speed transmission means operatively connected to drive the wheel members on at least one axle on one side of the vehicle and a second variable speed transmission means operatively connected to drive the wheel members on at least one axle on the other side of the vehicle,
    and brake means for differentially braking the wheel members on the respectively opposite sides of the vehicle,
    whereby said vehicle may be steered by driving the wheels on one side of the vehicle by the associated variable speed transmission means while concurrently braking the wheel members on the opposite side of the vehicle.

* * * * *